US006055844A

United States Patent [19]

[11] Patent Number: 6,055,844

[45] **Date of Patent: *May 2, 2000**

Kondo et al.

[54] AIR/FUEL RATIO DETECTION DEVICE AND AN AIR/FUEL RATIO CONTROL DEVICE

[75] Inventors: Noriaki Kondo; Hiroshi Inagaki; Shigeru Miyata, all of Nagoya, Japan

[73] Assignee: NGK Spark Plug Co., Ltd., Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,775

[22] Filed: Jun. 19, 1997

[30] Foreign Application Priority Data

Jun. 25, 1996 [JP] Japan .................................... 8-164513
Oct. 28, 1996 [JP] Japan .................................... 8-285219

[51] Int. Cl.[7] .................................................. G01M 15/00

[52] U.S. Cl. .......................................... 73/23.32; 73/118.1

[58] Field of Search ............................... 73/23.32, 118.1; 123/438, 443, 701, 704; 701/103

[56] References Cited

U.S. PATENT DOCUMENTS

| | | | |
|---|---|---|---|
| 4,690,121 | 9/1987 | Kawanabe et al. . | |
| 4,708,109 | 11/1987 | Takao . | |
| 5,231,864 | 8/1993 | Ishida et al. | 73/23.32 |
| 5,253,632 | 10/1993 | Brooks | 126/696 |
| 5,323,635 | 6/1994 | Ueno et al. | 73/23.32 |
| 5,353,776 | 10/1994 | Burraham et al. | 123/704 |
| 5,381,771 | 1/1995 | Leshner | 123/443 |
| 5,709,193 | 1/1998 | Svensson et al. | 123/438 |

FOREIGN PATENT DOCUMENTS

| | | |
|---|---|---|
| 60 233339 | 11/1985 | European Pat. Off. . |
| 0 490 612 | 6/1992 | European Pat. Off. . |
| 0 533 495 | 3/1993 | European Pat. Off. . |
| 57-195828 | 12/1982 | Japan . |
| 2 071 362 | 9/1981 | United Kingdom . |

*Primary Examiner*—Eric S. McCall
*Attorney, Agent, or Firm*—Sughrue, Mion, Zinn Macpeak & Seas, PLLC

[57] ABSTRACT

An air/fuel ratio detection device and an air/fuel ratio control device, in which combustion of an engine is controlled with a simple design and toxic substances in exhaust gas discharged from the engine are reduced. Time A during which a lean signal is at a high level is measured. If the time A is shorter than the predetermined value, it is determined that the air/fuel ratio is richer than a target value, and time B during which an electromagnetic valve 21 is open is lengthened, increasing the quantity of supply air and making leaner the fuel mixed air, such that the target air/fuel ratio is approached. If the time A is longer than the predetermined value, it is determined that the air/fuel ratio is leaner and the time B is shortened.

13 Claims, 9 Drawing Sheets

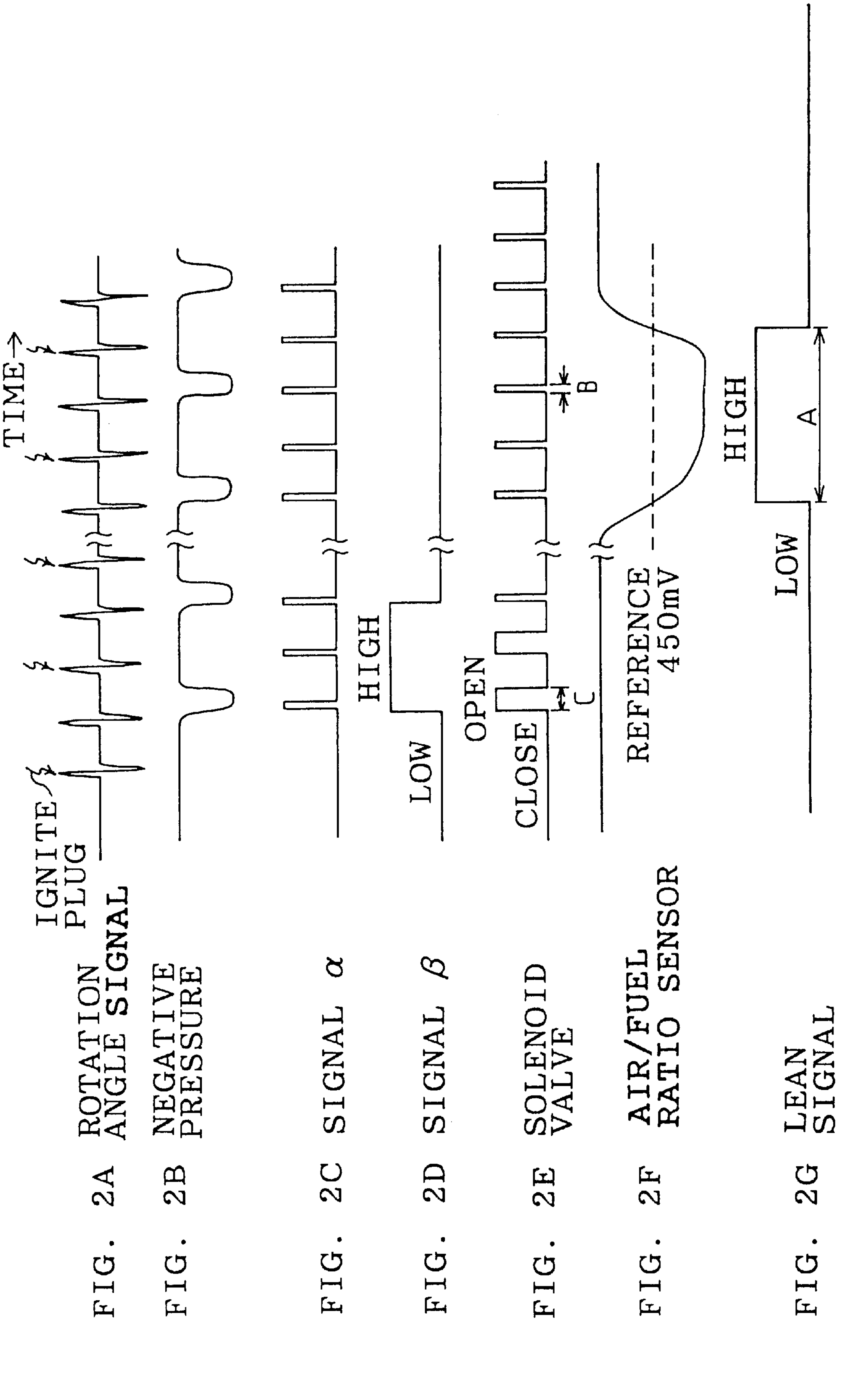
FIG. 2A ROTATION ANGLE SIGNAL
IGNITE PLUG
TIME→
FIG. 2B NEGATIVE PRESSURE
FIG. 2C SIGNAL α
FIG. 2D SIGNAL β
LOW
HIGH
FIG. 2E SOLENOID VALVE
CLOSE
OPEN
C
B
FIG. 2F AIR/FUEL RATIO SENSOR
REFERENCE 450mV
FIG. 2G LEAN SIGNAL
LOW
HIGH
A

FIG. 5A ROTATION ANGLE (720° SIGNAL)

FIG. 5B SOLENOID

FIG. 5C INJECTOR

FIG. 5D AIR/FUEL RATIO SENSOR

FIG. 5E AIR/FUEL RATIO

AIR/FUEL RATIO DETECTION DEVICE AND AN AIR/FUEL RATIO CONTROL DEVICE

BACKGROUND OF THE INVENTION

The invention relates to an air/fuel ratio detection device and an air/fuel ratio control device which can be mounted on a carburetor type, internal combustion engine for use in a small-sized boat, a small-sized generator, a mower etc., an engine having a fuel injection valve for use in an automobile etc., and other internal combustion engines.

Conventionally, in an engine mounted on the mower, no complex combustion control as is used in an automobile engine is used. In such small-sized, simple structures the number of revolutions and output are adjusted simply by using a carburetor and a throttle valve. The throttle valve is opened and the quantity of supply air is increased so as to increase the output and the number of revolutions.

The small engine, e.g. for mowers, is air cooled, and, as such, is less efficiently cooled as compared with a water cooled engine. In an air cooled engine, the concentration of fuel relative to air is high compared with a stoichiometric air/fuel ratio, at which the concentration of air is chemically equivalent to that of fuel. As a result, exhaust gas contains excessive uncombusted hydrocarbon.

Today research attempts to cope with environmental problems, by decreasing toxic components in the exhaust gas discharged from small engines.

However, the small engine is lightweight and cannot be provided with a catalytic converter, as this enlarges the entire size of the engine. Additionaly, such systems as in cars cannot be adopted in which the engine is combusted with the stoichiometric air/fuel ratio and the increase in temperature of the engine is controlled by circulating cooling water.

On the other hand, recently research has resulted in purified exhaust gas discharged from a water cooled automobile engine by controlling the air/fuel ratio to be lean, such that pollutions are prevented from being discharged by the engine immediately after the engine is started. A so-called universal air/fuel heated exhaust gas oxgen sensor for detecting the air-fuel ratio all over the region is required for such control.

The universal air/fuel heated exhaust gas oxygen sensor and the associated control devices presently available have a complicated, expensive structure, and are not very satisfactory for use in control executed just after the engine is started.

SUMMARY OF THE INVENTION

Wherefore, an object of the invention is to provide an air/fuel ratio detection device and an air/fuel ratio control device that can control combustion of an engine in a simple manner and decrease toxic components in the exhaust gas discharged from the engine.

To attain this and other objects, the present invention provides an air/fuel ratio detection device for use in an engine. When the air/fuel ratio is controlled to be richer than the stoichiometric air/fuel ratio at the time of usual operation, for example, when the engine is operated in a steady condition, the air/fuel ratio is temporarily made leaner than the stoichiometric air/fuel ratio, and a lean output time of a stoichiometric air/fuel ratio sensor detected by an air/fuel ratio detector is measured.

According to one aspect, the present invention provides an internal combustion engine air/fuel ratio detection device. The device comprises an air/fuel ratio detection means for detecting the air/fuel ratio of an air/fuel mixture supplied to an internal combustion engine, based on output transmitted from a stoichiometric air/fuel ratio sensor having an output rapidly changing in the vicinity of a desired air/fuel ratio; and an air/fuel ratio control means for adjusting the air/fuel mixture to control the air/fuel ratio.

When the air/fuel ratio is controlled to be richer than the stoichiometric air/fuel ratio during normal engine operation, the air/fuel ratio control means is operated, temporarily making the air/fuel ratio leaner than the stoichiometric air/fuel ratio, the air/fuel ratio detection means detects a lean output time, and the proper air/fuel ratio for the normal operation is obtained based on the lean output time.

According to another aspect, the present invention provides a method of controlling the air/fuel ratio of an internal combustion engine comprising the steps of:

a) using a stoichiometric air/fuel ratio sensor accurately responsive to small changes in exhaust gas oxygen content at a desired air/fuel combustion ratio to measure exhaust gas oxygen content and provide an output signal representing this measure;

b) providing an engine rotation speed representative signal in the form of a series of pulses synchronized with engine rotation;

c) correlating the signals of steps a) and b) to provide a control signal of a desired duration synchronously with engine speed signal to temporarily adjust the air/fuel ratio;

d) using changes in the oxygen measurement signal responsive to the temporary adjustment in step c) to change of duration of a subsequent control signal to correct the air/fuel ratio to closely approach a desired air/fuel ratio.

A stoichiometric air/fuel ratio sensor provides large output variances only in the vicinity of the stoichiometric air/fuel ratio of about 14.4, $\lambda=1$.

To solve this problem, according to the invention, the air-fuel ratio is made lean for a predetermined time TH at a predetermined interval by an air/fuel ratio controller. When the engine is usually operated with a rich air/fuel ratio, the air/fuel ratio is temporarily made leaner than the stoichiometric air/fuel ratio. The air/fuel ratio while the engine is operated in a steady state is estimated or detected from a lean output time TS during which a lean signal is transmitted from the stoichiometric air/fuel ratio sensor while the air/fuel ratio is temporarily lean. Therefore, the air/fuel ratio can be detected in a simple structure, with a stoichiometric air/fuel ratio sensor.

The air/fuel ratio in the steady operation is estimated from the lean output time TS of the stoichiometric air/fuel ratio sensor. Therefore, the air/fuel ratio in a wide range can be detected in a simple structure, with a stoichiometric air/fuel ratio sensor mounted on the small engine.

The air/fuel ratio is controlled lean by opening a control valve and increasing the quantity of supply air for a time T1 related with an open time T0 during which the control valve is opened.

Specifically, when the air/fuel ratio is detected, if the lean output time TS of the stoichiometric air/fuel ratio sensor equals the predetermined time TA, it is determined that the air/fuel ratio in the steady operation equals a target air/fuel ratio. If the lean output time TS is longer than the predetermined time TA, it is determined that the air/fuel ratio in the steady operation is leaner than the target air/fuel ratio. If the lean output time TS is shorter than the predetermined time TA, it is determined that the air/fuel ratio in the steady operation is richer than the target air/fuel. The steady, open time of the control valve in the air/fuel ratio control device can be adjusted based on determination result.

Actually, when the relationship between T0 and T1 and between TA and TS are essential, and are set, for example:

$$T1=T0+TD \quad (1),$$

in which TD is a predetermined value, the air/fuel ratio is deviated toward the lean side by a predetermined air/fuel ratio λ D for a predetermined time TH, relative to an increment TD, in the region where the air/fuel ratio changes almost linearly relative to the open time of the control valve. Therefore, the following relationship results:

$$\lambda 1=\lambda 0+\lambda D \quad (2),$$

in which λ 0 is the air/fuel ratio in the steady operation and λ 1 is the air/fuel ratio during the predetermined time TH. In this case, a function TS of λ 0, λ 1 and TH results. The relationship cannot be represented precisely, and the following simple model formula results.

$$TS=\alpha\times TH\times(\lambda 0+\lambda 1) \quad (3)$$
$$=\alpha\times TH\times(2\lambda 0+\lambda D),$$

in which α is a constant.

The richer the air/fuel ratio in the steady operation is and the smaller the value of λ 0 is, the shorter the lean output time TS of the stoichiometric air/fuel ratio sensor becomes. Therefore, the value of λ 0 can be calculated by detecting TS from the formula (3).

The temperature of an air cooled engine is controlled by directly detecting the temperature of the engine and controlling the air/fuel ratio to prevent overheating, however, since the heat capacity of the engine is large, temperatures change slowly and the air/fuel ratio becomes excessively rich or lean because of delayed control. In this case, toxic components in the exhaust gas cannot be decreased, and engine temperature varies excessively from the desired temperature.

In the present invention, however, the air/fuel ratio itself is controlled by exhaust oxygen measurement and engine speed and air/fuel ratio changes can be quickly made for by the air/fuel ratio detector. Therefore, the actual air/fuel ratio only changes by small amounts from the target air/fuel ratio, and control frequencies are high. As a result, deviation of the air/fuel ratio and the engine temperature from target values can be advantageously minimized.

The air/fuel ratio control device is provided with the aforementioned air/fuel ratio detector integrally forming the air/fuel ratio detection device. The air/fuel ratio can be controlled in a simple structure.

Also, when secondary air is introduced to a location upstream of the stoichiometric air/fuel ratio sensor attached to an exhaust pipe of the small engine, the engine can be operated stably at a low temperature by adjusting richness of the air/fuel ratio to be controlled in a system. Therefore, the air/fuel ratio detected by the stoichiometric air/fuel ratio sensor can be set very lean and the precision and stability of control can be improved.

BRIEF EXPLANATION OF DRAWING FIGURES

The invention will now be described by way of example, with reference to the accompanying drawings, in which:

FIGS. 2A–2G are time charts showing operation of the air/fuel ratio controller according to the first embodiment;

DETAILED DESCRIPTION OF THE PREFERRED EMBODIMENTS

First Embodiment

A structure of an air/fuel ratio controller formed integrally with an air/fuel ratio detector (hereinafter referred to as the air/fuel ratio controller), for use in a small engine having a single cylinder, mounted on a mower, in which fuel is supplied via a carburetor is now explained.

Figure 1:
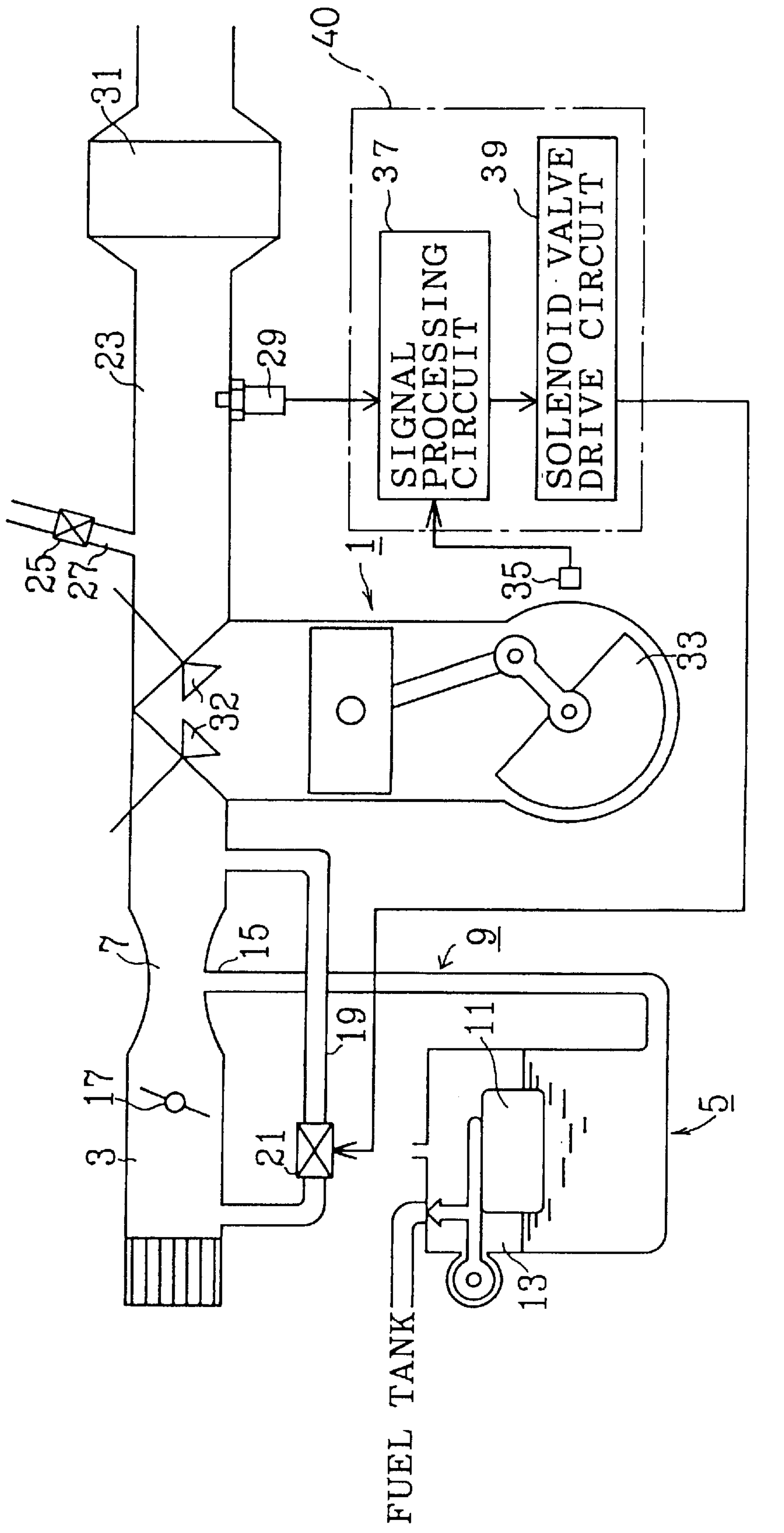
FIG. 1 is a diagrammatic representation showing the structure of an air/fuel ratio controller according to a first embodiment of the present invention.

As shown in FIG. 1, a carburetor 9 provided with a fuel supply 5 and a Venturi tube 7 is connected to an air inlet pipe 3 of a small engine 1. The fuel supply 5 is composed of a float chamber 13 for storing fuel supplied from a fuel tank (not shown), the fuel level being adjusted with a float 11 movable vertically, and a nozzle 15 connecting to the bottom of the float chamber 13 and opening to the Venturi tube 7 for supplying fuel to the air inlet pipe 3.

The air inlet pipe 3 is provided with a bypass 19 to bypass a throttle valve 17 in the pipe 3 and the Venturi tube 7, to supply air only to the downstream side of the Venturi tube 7 by way of the bypass so as to adjust the air/fuel ratio or the fuel mixture ratio. A solenoid valve 21 is disposed on the bypass 19 for controlling the bypass 19 to open and closed positions. The solenoid valve 21 is opened when electricity is conducted to the solenoid valve 21 and is closed when no electricity is conducted, by controlling the duty ratio.

An exhaust pipe 23 is provided with a secondary air introducing pipe 27 for introducing secondary air from its upstream side via a solenoid valve 25, a stoichiometric air/fuel ratio sensor 29 and an exhaust gas purifying catalyzer 31. The stoichiometric air/fuel ratio sensor 29 has a detection element to detect oxygen concentration with platinum electrodes disposed on both faces of a zirconia solid electrolyte base. Electrical output of the stoichiometric air/fuel ratio sensor 29 is rapidly changed at a stoichiometric point of the theoretically correct air/fuel ratio.

In the air/fuel ratio controller, a control circuit 40 is provided with a signal processing circuit 37 for processing signals transmitted from the stoichiometric air/fuel ratio sensor 29 and a rotation angle sensor 35 for detecting the rotation angle of the engine 1 with a magnet attached to a flywheel 33. The control circuit 40 is also provided with a solenoid valve drive circuit 39 for transmitting a control signal based on the signal transmitted from the signal processing circuit 37 to the solenoid valve. The quantity of supply air is adjusted and the air/fuel ratio is controlled by operating the solenoid valve 21 in response to the drive signal transmitted from the solenoid valve drive circuit 39.

Operation of the air/fuel ratio controller is now explained referring to FIGS. 2A–2G.

While the engine 1 is rotating, as shown in FIG. 2A, a rotation angle pulse signal is transmitted from the rotation angle sensor 35. A spark plug is ignited once while two pulse signals are transmitted from the rotation angle sensor 35 for each combustion cycle. As shown in FIG. 2B, the negative pressure in the air inlet pipe 3 changes in response to operation of valves 32 while the engine 1 is rotating.

In the signal processing circuit 37, according to the rotation angle signal transmitted from the rotation angle sensor 35, as shown in FIG. 2C, signal$\alpha$ is produced synchronously with the negative pressure in the air inlet pipe 3, for example, at a frequency of 60 Hz. As shown in FIG. 2D, signal$\beta$, having three times the duration as that of the signal$\alpha$, is produced based on the signal$\alpha$ at a predetermined frequency, for example, at a frequency of 0.2 Hz.

The signal processing circuit 37, as shown in FIG. 2E, generates a solenoid valve 21 control signal based on signals $\alpha$ and $\beta$, and the solenoid valve drive circuit 39 responds with the solenoid valve 21 actuating signal. The solenoid valve signal is transmitted synchronously with the signal$\alpha$. While the signal$\beta$ is usually at zero level, solenoid valve control signals are transmitted to the solenoid valve 21, such that the solenoid valve 21 is opened for a time B at periodic intervals. On the other hand, while the signal$\beta$ is at a high level, solenoid valve signals are also transmitted at periodic intervals, thereby opening the solenoid valve 21 for a predetermined time C, such that the air/fuel ratio is temporarily made lean by air from the bypass 19. The time C is set longer than the time B. Although the time B or C varies with operation conditions, in the embodiment, the time B is set as 5ms and the time C is set as 10 ms.

While the signal$\beta$ is at a high level, the solenoid valve 21 is opened for longer periods, thereby temporarily adjusting the air/fuel ratio to a lean ratio.

When the solenoid valve 21 is opened by the solenoid valve actuating signal, as shown in FIG. 2F, a sensor signal transmitted from the stoichiometric air/fuel ratio sensor 29 decreases below than a reference value of 450 mV, in this embodiment, as the air/fuel ratio is changed from the rich to lean. In the signal processing circuit 37, as shown in FIG. 2G, a lean signal is produced, which is at a high level while the sensor signal is below the reference value. The duration while output is below 450 mV is called the loan inversion time.

In the embodiment, a time A, during which the lean signal is at a high level, is measured. If the time A is shorter than a predetermined value, the time B is made longer. Specifically, when the lean signal is at a high level for a short time, it means that the air/fuel ratio easily returns to the rich side and the air/fuel ratio is deviating from the target value toward the rich side. The open time B of the solenoid valve 21 is then increased, where by the quantity of air supply is increased and the air/fuel ratio is made less rich, thereby approaching the target air/fuel ratio and vice-versa.

By this arrangement the air/fuel ratio can be appropriately controlled to a target value, which deviates little from the stoichiometric air/fuel ratio $\lambda$=1, using a simple, inexpensive stoichiometric air/fuel ratio sensor. A universal air/fuel heated exhaust gas oxygen sensor or other complicated, expensive sensor for use in an automobile is not necessary.

In this embodiment, the target air/fuel ratio is $\lambda$=0.92 as predetermined by experiment, such that the temperature of the engine 1 does not exceed a predetermined temperature even when the engine 1 is operated for a long time and toxic substances in exhaust gas are minimized.

In this embodiment, control frequencies are high and the air/fuel ratio can be immediately changed as needed with little deviation from the target air/fuel ratio. Consequently, deviation of the air/fuel ratio and the preferred engine temperature can be advantageously minimized.

Experiment

An experiment, which was conducted to demonstrate the effectiveness of the embodiment, is now explained.

Figure 3A:
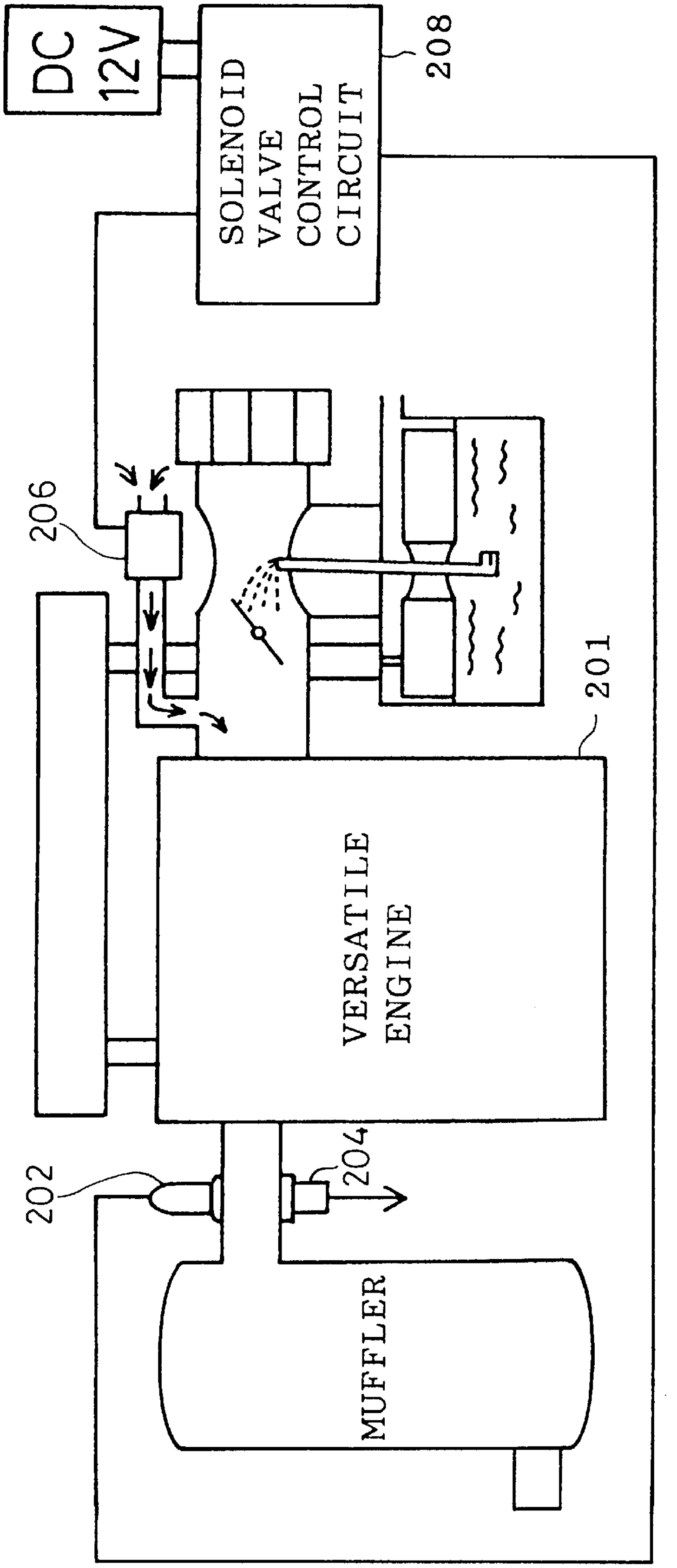
FIG. 3A is a diagrammatic representation showing the structure of an experimental device according to the present invention and FIG. 3B is a time chart showing signals in the experimental device.

In an experimental device shown in FIG. 3A, a solenoid valve 206 is opened or closed by a solenoid valve control circuit 208 synchronously with the frequency of an alternating voltage transmitted from a generator connected to the output shaft of a small engine 201. The alternating voltage is synchronous with rotation of the engine 201. Therefore, the solenoid valve 206 can be opened or closed synchronously with the rotation of the engine 201 by the electromotive valve control circuit 208.

The duty ratio of opening and closing of the solenoid valve 206 is optimized such that hunting of the small engine 201 is avoided. The solenoid valve 206 is opened longer than optimum, at predetermined intervals. According to the lean inversion time, the air/fuel ratio is estimated and the duty ratio of the solenoid valve 206 is controlled, thereby adjusting the air/fuel ratio.

The small engine 201 used in the experiment has a model No. EH25 manufactured by Lobin, and is provided with an overhead cam shaft and is an air-cooled, 4-cycle single cylinder with a capacity of 251 cc.

Experimental Conditions

Engine conditions: rated revolution (about 3600 rpm)

Engine load: no load, 500W (14.3%), 1500W (43%), 2500W (71.4%), or 3500W (100%)

Experiment Method

Figure 3B:
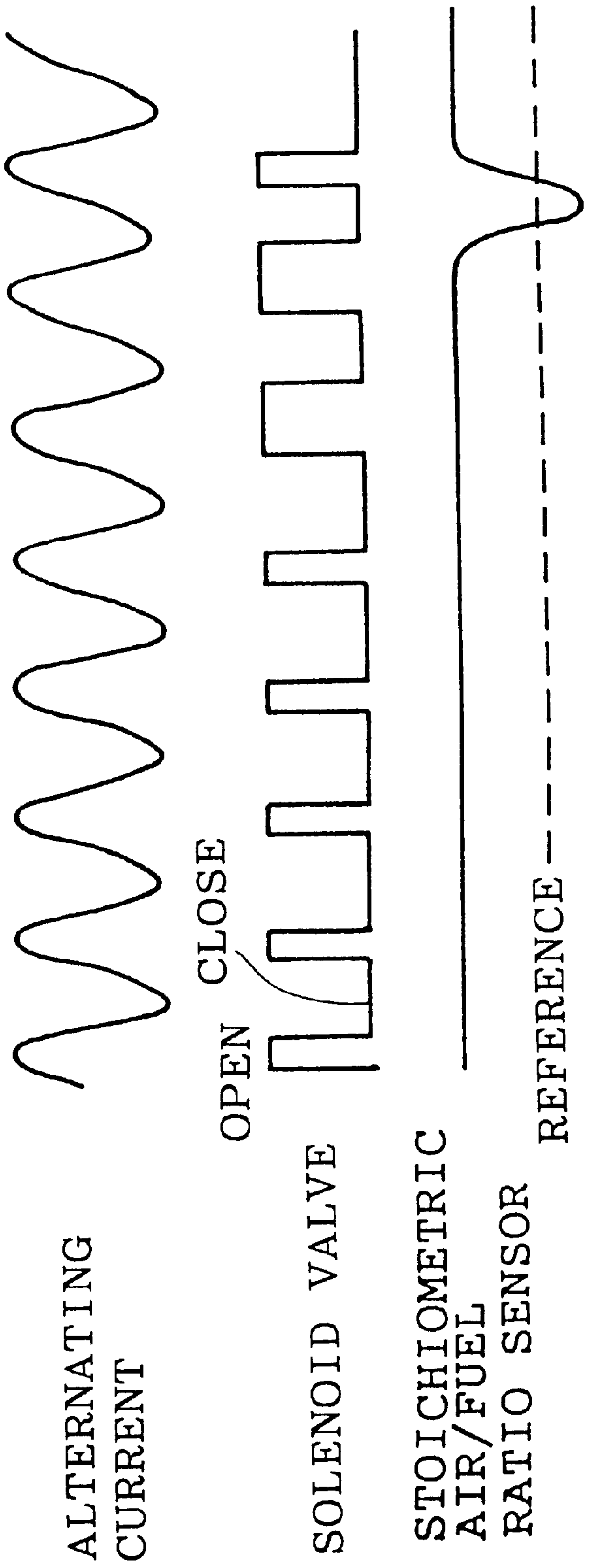

As shown in FIG. 3A, a bypass having a diameter of 5.7 mm was provided at the downstream side of a throttle valve and the solenoid valve 206 was connected to the bypass. The duty ratio of opening and closing of the solenoid valve 206 was variable with a trimmer. Referring to FIG. 3B, the solenoid valve 206 is open longer at a predetermined interval 5 seconds (at a cycle of 0.2 Hz). In the experiment, opening duration of the solenoid valve 206 was set longer in two ways: one signal representing the negative pressure in an air inlet pipe (two pulses of engine rotation angle signal); and two signals representing the negative pressure (four pulses of engine rotation angle signal). The open time of the solenoid valve 206 was also variable with a trimmer.

The duty ratio of opening and closing of the solenoid valve 206 in a steady condition was optimized, so that hunting of the engine 201 was avoided. At intervals of 5 seconds the solenoid valve 206 was opened time C larger than time B. According to the signal transmitted from a stoichiometric air/fuel ratio sensor 202 representing the lean inversion time, the duty ratio for operating the solenoid valve 206 in a steady engine operating condition was controlled, thereby adjusting the air/fuel ratio as the solenoid valve 206 was operated. The air/fuel ratio was measured with a universal air/fuel heated exhaust gas oxygen sensor 204.

Experiment Results

As the load applied to the engine 201 was increased from zero to 71%, by optimizing the duty ratio of the solenoid valve 206 corresponding to time B according to the lean inversion time, the air/fuel ratio was controlled to a constant air/fuel ratio ranging between 13.3 and 13.5 without any hunting of the engine 201. When the load applied to the engine 201 was 100%, the air/fuel ratio could be controlled in the same manner as in no load, because of restriction of flow rate of air controlled by the solenoid valve 206. However, by setting the duty ratio corresponding to the time C such that load of 96% was applied to the engine 201, the air fuel ratio could be adjusted to 12.9.

Second Embodiment

A structure is now explained of the air/fuel ratio controller, for use in an automotive engine, in which fuel is supplied via a fuel injection valve.

While the engine which has a single cylinder is started and warmed up, the air/fuel ratio is controlled to be lean, i.e. 14 to 16. After the engine is warmed up, the air/fuel ratio is controlled to a stoichiometric ratio. At normal operating temperatures the engine is operated in a steady air/fuel ratio condition, except when the air/fuel ratio is changed temporarily.

Figure 4:
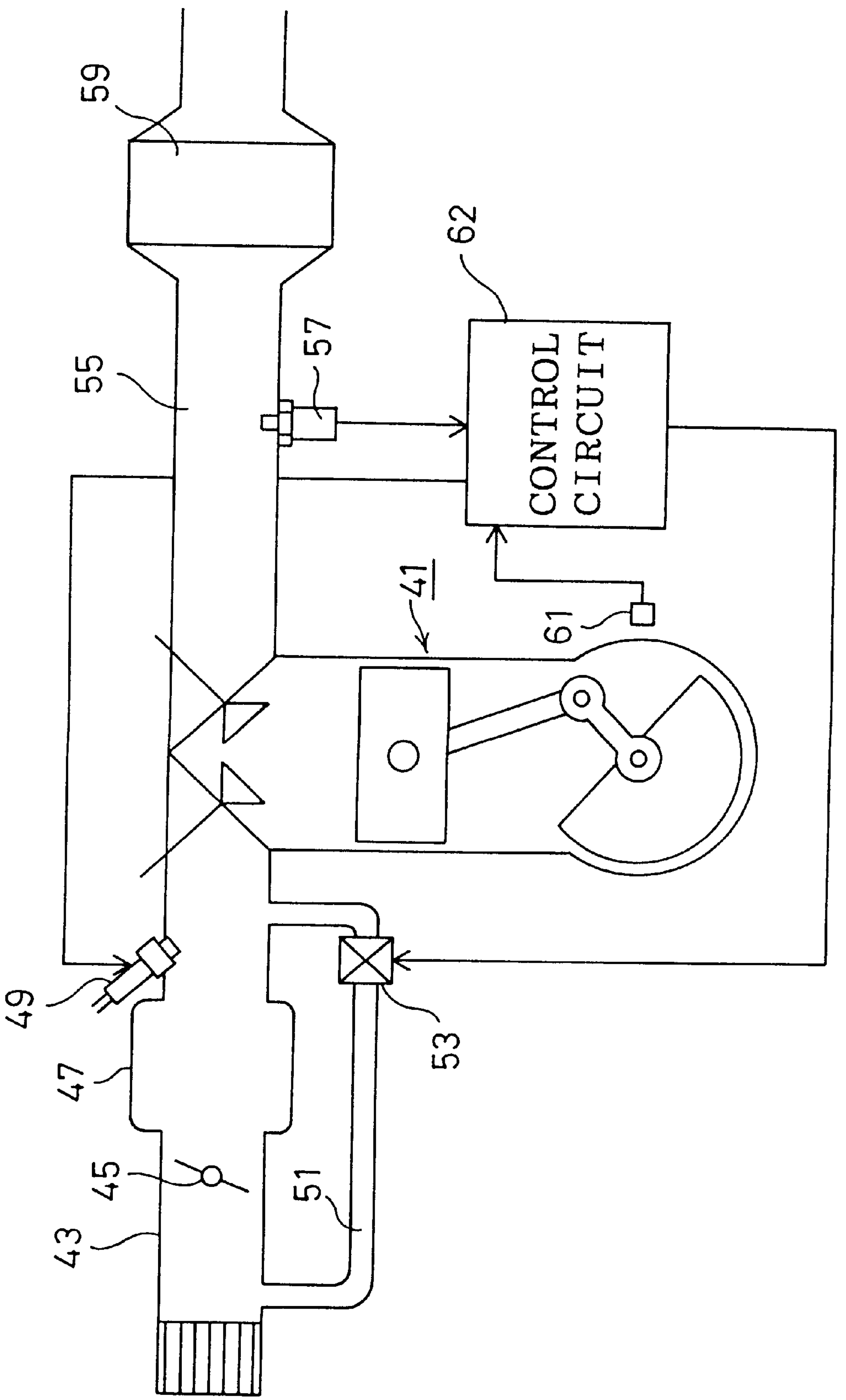
FIG. 4 is a diagrammatic representation showing the structure of an air/fuel ratio controller according to a second embodiment of the present invention.

As shown in FIG. 4, an air inlet pipe 43 of an engine 41 is provided with a throttle valve 45 for adjusting the quantity of air supplied from its upstream side, a surge tank 47 for controlling surge in air flow and a fuel injection valve 49 for injecting fuel into the air inlet pipe 43.

The air inlet pipe 43 is also provided with a bypass 51 to bypass the throttle valve 45 and the surge tank 47, to supply air only to the downstream side of the surge tank 47, to control the air/fuel ratio. The bypass 51 is provided with a solenoid valve 53 for opening or closing the bypass 51. When electricity is conducted to the solenoid valve 53, the bypass 51 is closed, while when no electricity is conducted to the solenoid valve 53, the bypass 51 is open.

An exhaust pipe 55 is provided with a stoichiometric air/fuel ratio sensor 57 whose output rapidly changes at a stoichiometric point, and an exhaust gas purifying catalyst 59.

Signals transmitted from the stoichiometric air/fuel ratio sensor 57 and a rotation angle sensor 61 for detecting the rotation angle of the engine 41 are processed in a control circuit 62. Subsequently, a drive signal is transmitted from the control circuit 62 to the solenoid valve 53. The quantity of supply air is adjusted, when the throttle valve 45 is in a desired position, and the air/fuel ratio is controlled, by opening or closing the solenoid valve 53.

A lean control in the air/fuel ratio controller of the second embodiment immediately after the engine 41 is started is now explained referring to FIGS. 5A–E.

Figure 5:
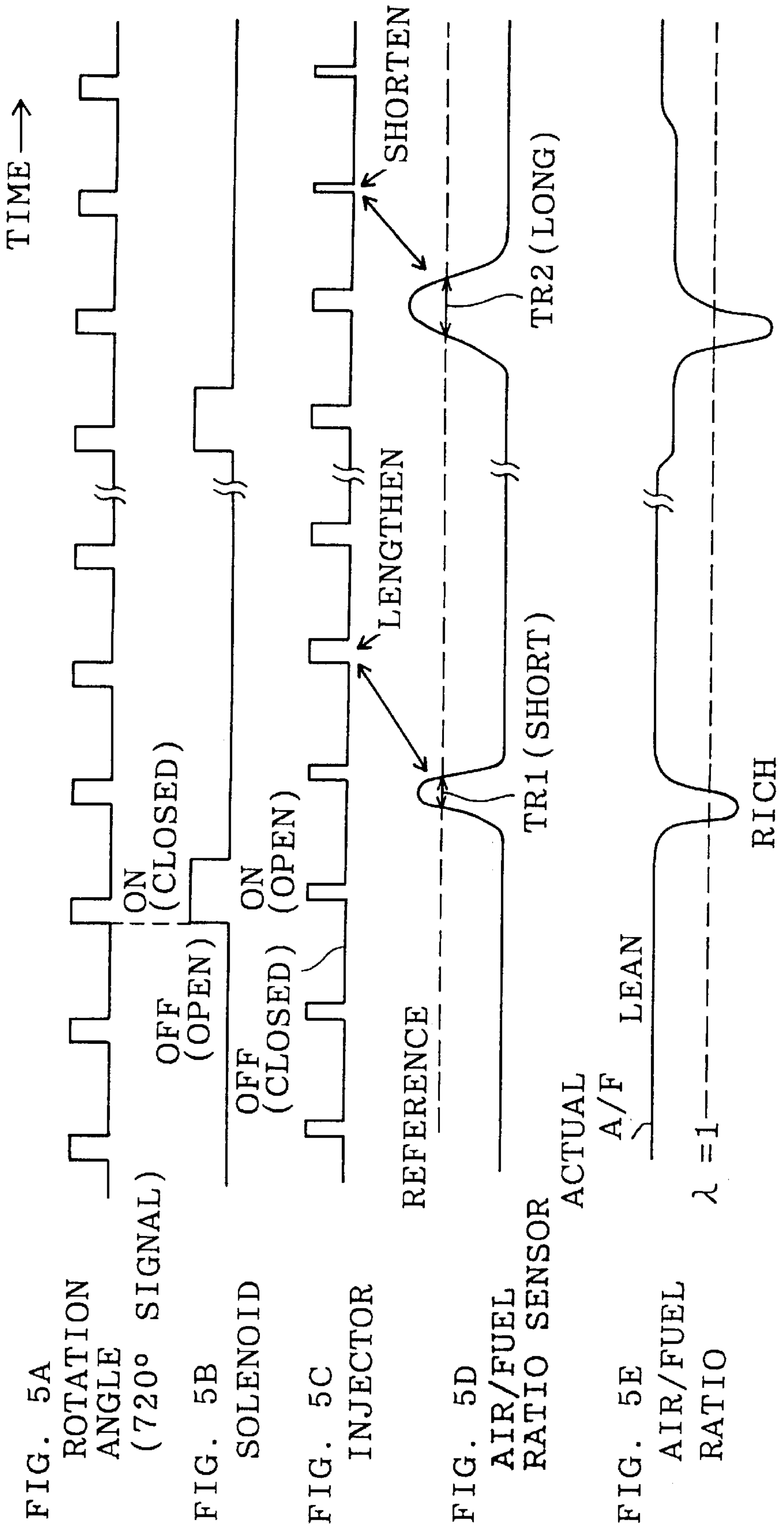
FIGS. 5A–5E are time charts showing operation of the air/fuel ratio controller according to the second embodiment.

As shown in FIG. 5A, a pulse signal is transmitted from the rotation angle sensor 61 every 720 degrees or each time the engine 41 rotates twice.

For the purpose of detecting an actual air/fuel ratio by temporarily making rich the air/fuel ratio, as shown in FIG. 5B, at predetermined times, here once every four times the pulse signal is transmitted from the rotation angle sensor 61, a solenoid control signal is transmitted to close the solenoid valve 53 thereby decreasing the air supply to the engine.

Subsequently, as shown in FIG. 5D, output from the stoichiometric air/fuel ratio sensor 57 rapidly increases beyond the reference value, and as shown in FIG. 5E the actual air/fuel ratio temporarily becomes rich.

A rich output time TR1 of the stoichiometric air/fuel ratio sensor 57 is measured and compared with the reference value obtained when the target air/fuel ratio is attained. If the measured rich output time TR1 is shorter than the reference value, it is determined that the actual air/fuel ratio is leaner than the target air/fuel ratio. As shown in FIG. 5C, ON time of an injector signal for opening the fuel injection valve 49 is lengthened, thereby increasing the quantity of supply fuel.

Subsequently, as shown in FIG. 5D, if the output from the stoichiometric air/fuel ratio sensor 57 rapidly increases beyond the reference value again, as shown in FIG. 5E the actual air/fuel ratio temporarily becomes rich again.

A rich output time TR2 of the stoichiometric air/fuel ratio sensor 57 is measured and compared with the reference value obtained when the target air/fuel ratio is attained. If the measured rich output time TR2 is longer than the reference value, it is determined that the actual air/fuel ratio is richer than the target air/fuel ratio. As shown in FIG. 5C, ON time of an injector signal for opening the fuel injection valve 49 is shortened, thereby decreasing the quantity of supply fuel.

As aforementioned, in the second embodiment while the lean control is executed when the engine 41 is started until it has warmed up, the air/fuel ratio is temporarily made rich, and the rich output time of the stoichiometric air/fuel ratio sensor 57 is measured. According to the measured rich output time, the opening or closing of the fuel injection valve 49 is controlled, thereby increasing or decreasing the quantity of supplied fuel. The air/fuel ratio is controlled to be the target air/fuel ratio by adjusting the fuel mixture ratio. Therefore, the air/fuel ratio can be controlled to be the target air/fuel ratio, which is leaner than the stoichiometric air/fuel ratio $\lambda=1$, by using the simple, inexpensive stoichiometric air/fuel ratio sensor, obviating the necessity of the universal air/fuel heated exhaust gas oxygen sensor or other complicated, expensive stoichiometric air/fuel ratio sensor.

After the engine 41 is warmed up, a stoichiometric control is executed.

Third Embodiment

Figure 6:
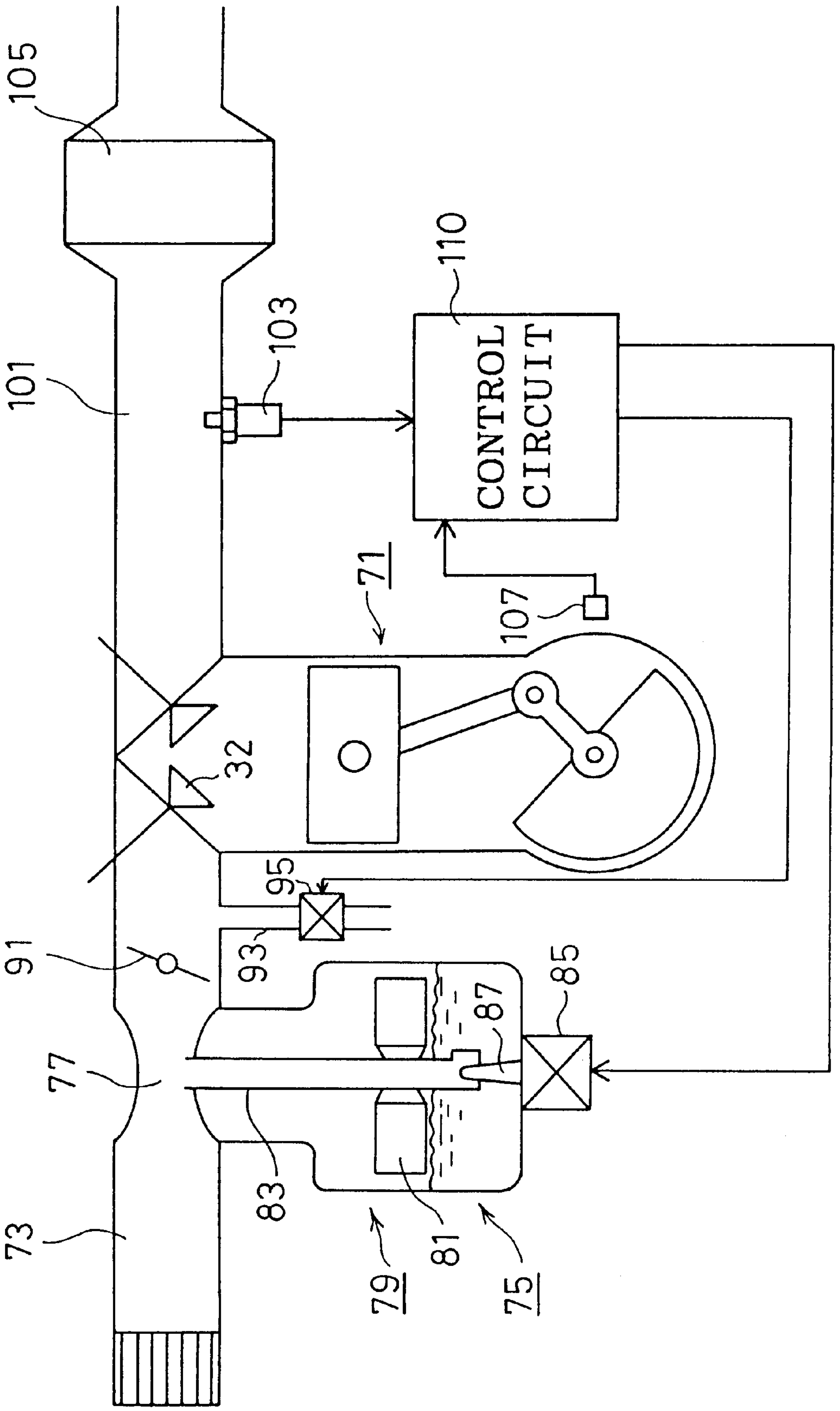
FIG. 6 is a diagrammatic representation showing the structure of an air/fuel ratio controller according to a third embodiment of the present invention.

Referring to FIG. 6, a small engine has a single cylinder with a carburetor usually adjusted, such that air/fuel ratio becomes rich, i.e. between 13 and 14.

As shown in FIG. 6, in the air/fuel ratio controller of the third embodiment, a carburetor 79 provided with a fuel supply 75 and a Venturi tube 77 is connected to an air inlet pipe 73 of the small engine 71. The fuel supply 75 is composed of a float 81, a nozzle 83 and a solenoid valve 85 for adjusting the quantity of fuel supply.

Figure 7A:
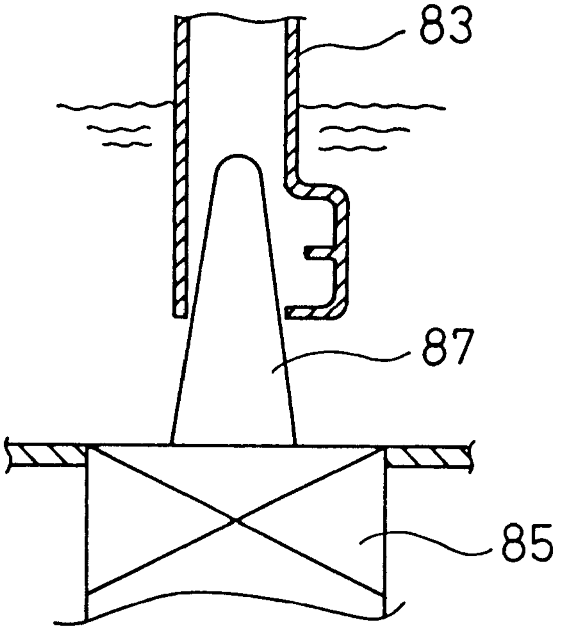
FIGS. 7A and 7B are explanatory views showing fuel supply operation of the air/fuel ratio controller in the third embodiment.
Figure 7B:
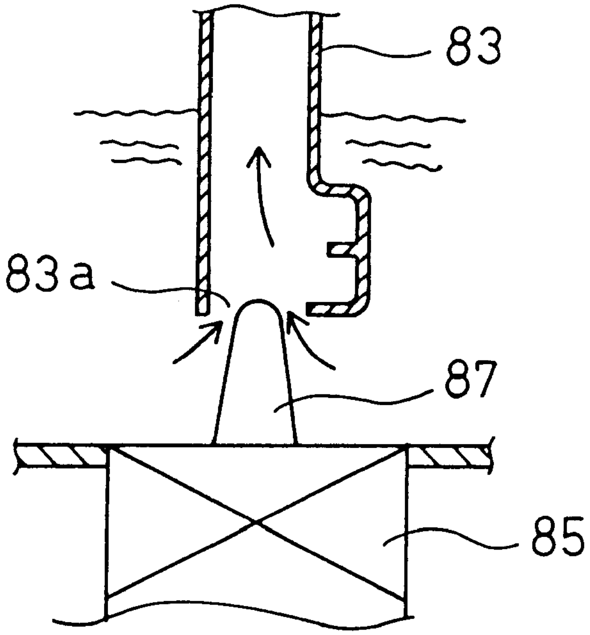

Referring also to FIGS. 7A and 7B, when the solenoid valve 85 is closed (FIG. 7A), a conical rod 87 is positioned upwardly, closing an opening 83*a* formed in the lower end of the nozzle 83. When the solenoid valve 85 is open (FIG. 7B), the rod 87 is moved down, the opening 83*a* is opened, and fuel is supplied via the nozzle 83 to the air inlet pipe 73.

Returning to FIG. 6, the air inlet pipe 73 is provided with an air passage 93 for supplying only air to the downstream side of the Venturi tube 77 and a throttle valve 91 and adjusting the fuel mixture ratio or air/fuel ratio. The air passage 93 is provided with a solenoid valve 95 for opening or closing the air passage 93. The opening or closing of the solenoid valve 95 so that when electricity is conducted to the solenoid valve 95, the air passage 93 is opened. When no electricity is conducted to the solenoid valve 95 the air passage 93 is closed.

An exhaust pipe 101 is provided with a stoichiometric air/fuel ratio sensor 103 whose output rapidly changes at a stoichiometric point, and an exhaust gas purifying catalyst 105.

In the air/fuel ratio controller, signals transmitted from the stoichiometric air/fuel ratio sensor 103 and an engine rotation angle sensor 107 are processed by a control circuit 110. Subsequently, an actuating signal is transmitted from the control circuit 110 to the solenoid valves 85 and 95. The quantity of supply air or fuel is adjusted and the air/fuel ratio is controlled, by opening or closing the solenoid valves 85 and 95.

Operation of the air-fuel controller in the third embodiment is now explained referring to FIGS. 8A–8E.

Figures 8A, 8B, 8C, 8D, 8E:
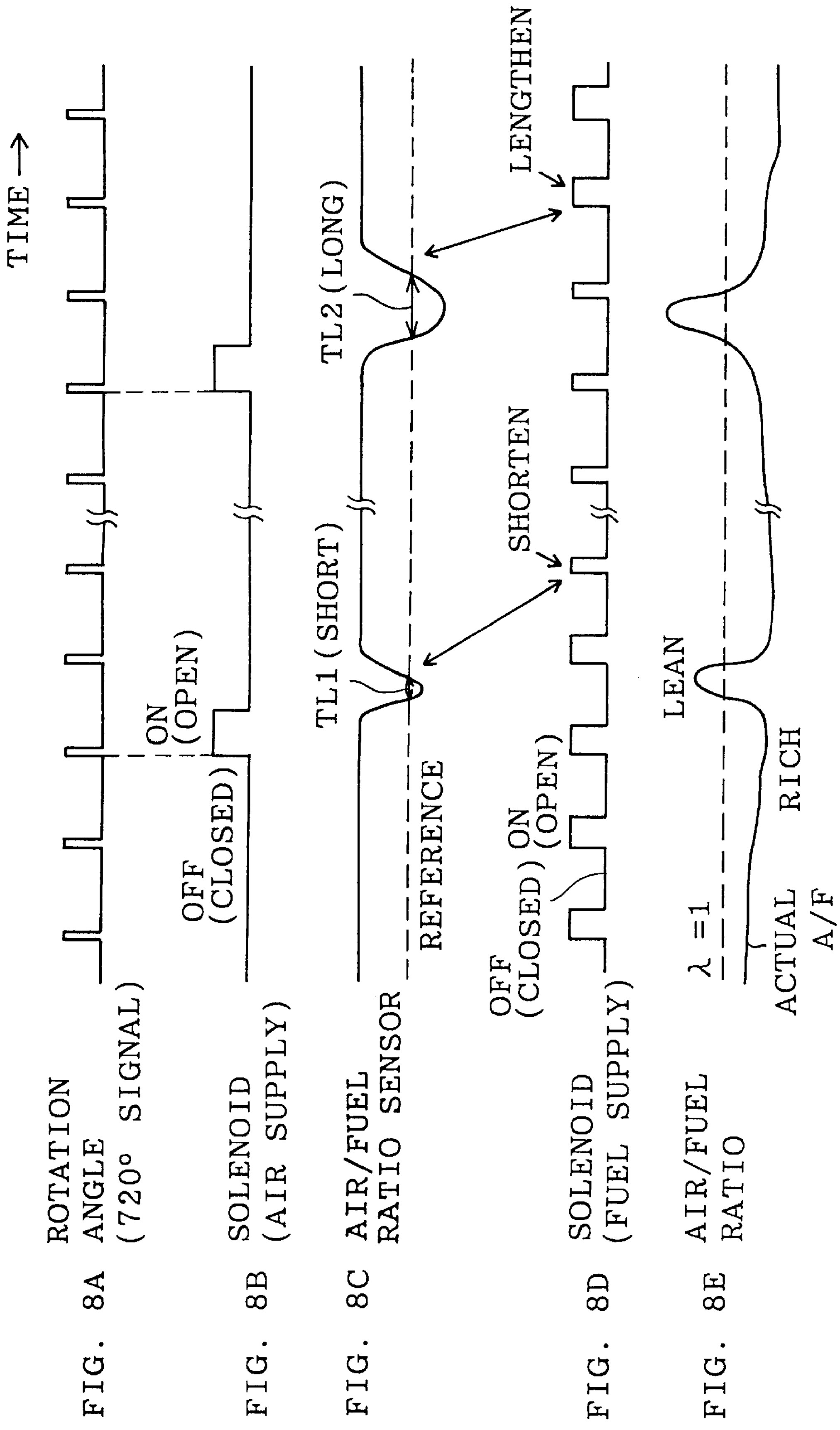
FIGS. 8A–8E are time charts showing operation of the air/fuel ratio controller according to the third embodiment.

After the engine 71 is started, as shown in FIG. 8A, a pulse signal is transmitted from the rotation angle sensor 107 every 720 degrees (i.e. each time the engine 71 rotates twice).

For the purpose of detecting an actual air/fuel ratio by temporarily making lean the air/fuel ratio, as shown in FIG. 8B, every four times the pulse signal is transmitted from the rotation angle sensor 107, a solenoid signal is transmitted to the solenoid valve 95 to open passage 93 thereby increasing the quantity of air supply.

Subsequently, as shown in FIG. 8C, output from the stoichiometric air/fuel ratio sensor 103 rapidly decreases below the reference value, and as shown in FIG. 8E the actual air/fuel ratio temporarily becomes lean.

A lean output time TL1 of the stoichiometric air/fuel ratio sensor 103 is measured and compared with a reference value obtained when a target air/fuel ratio is attained. If the measured lean output time TL1 is shorter than the reference value, it is determined that the actual air/fuel ratio is richer than the target air/fuel ratio. As shown in FIG. 8D, ON time of a solenoid signal for opening the solenoid valve 85 for fuel supply is shortened, thereby decreasing the quantity of supply fuel.

Subsequently, as shown in FIG. 8C, if the output from the stoichiometric air/fuel ratio sensor 103 rapidly decreases below the reference value again, as shown in FIG. 8E the actual air/fuel ratio temporarily becomes lean again.

A lean output time TL2 of the stoichiometric air/fuel ratio sensor 103 is measured and compared with the reference value obtained when the target air/fuel ratio is attained. If the measured lean output time TL2 is longer than the reference value, it is determined that the actual air/fuel ratio is leaner than the target air/fuel ratio. As shown in FIG. 8D, ON time of an solenoid signal for opening the solenoid valve 85 is lengthened, thereby increasing the quantity of supply fuel.

In the third embodiment the air/fuel ratio can be controlled to be the target air/fuel ratio, which is leaner than the stoichiometric air/fuel ratio $\lambda=1$, by using the simple, inexpensive stoichiometric air/fuel ratio sensor, obviating the necessity of the universal air/fuel heated exhaust gas oxygen sensor or other complicated, expensive stoichiometric air/fuel ratio sensor.

For example, in the first embodiment, the air/fuel ratio detected by the stoichiometric air/fuel ratio sensor can be varied by adjusting the quantity of secondary air through passage 27 thereby permitting the air/fuel ratio to be controlled over a wide range using the stoichiometric air/fuel ratio sensor.

The stoichiometric air/fuel ratio sensor for detecting the air/fuel ratio, which includes the oxygen concentration cell in the embodiments, can be provided with a titania or other metal oxide semi-conductor whose resistance is variable.

What is claimed is:

1. An internal combustion engine air/fuel ratio detection device comprising:

an air/fuel ratio detection means for detecting the air/fuel ratio of an air/fuel mixture supplied to an internal combustion engine, based on output transmitted from a stoichiometric air/fuel ratio sensor having an output rapidly changing when proximate a desired air/fuel ratio; and an air/fuel ratio control means for adjusting the air/fuel mixture to control the air/fuel ratio, wherein when the air/fuel ratio is controlled to be richer than the stoichiometric air/fuel ratio during engine operation, said air/fuel ratio control means is operated, temporarily making the air/fuel ratio leaner than the stoichiometric air/fuel ratio, said air/fuel ratio detection means detects a lean output time, and a proper air/fuel ratio for said engine operation is obtained based on the lean output time.

2. An internal combustion engine air/fuel ratio detection device comprising:

an air/fuel ratio detection means for detecting the air/fuel ratio of an air/fuel mixture supplied to an internal combustion engine, based on output transmitted from a stoichiometric air/fuel ratio sensor having an output rapidly changing when proximate a desired air/fuel ratio; and an air/fuel ratio control means for adjusting the air/fuel mixture to control the air/fuel ratio, wherein when the air/fuel ratio is controlled to be leaner than the stoichiometric air/fuel ratio during engine operation, said air/fuel ratio control means is operated, temporarily making the air/fuel ratio richer than the stoichiometric air/fuel ratio, said air/fuel ratio detection means detects a rich output time, and a proper air/fuel ratio for said engine operation is obtained based on the rich output time.

3. An air/fuel ratio detection device according to claim 1, wherein the air/fuel ratio is temporarily controlled by adjusting a quantity of air supplied to said engine.

4. An air/fuel ratio detection device according to claim 2, wherein the air/fuel ratio is temporarily controlled by adjusting a quantity of air supplied to said engine.

5. An air/fuel ratio control device according to claim 1, wherein the air/fuel ratio is controlled to be a desired air/fuel ratio by adjusting a quantity of fuel supplied to said engine.

6. An air/fuel ratio control device according to claim 2, wherein the air/fuel ratio is controlled to be a desired air/fuel ratio by adjusting a quantity of fuel supplied to said engine.

7. An air/fuel ratio control device comprising:

an air/fuel ratio detection means for detecting the air/fuel ratio of air/fuel mixture supplied to a small engine having a carburetor, and control means, responsive to the air/fuel ratio detected by said air/fuel ratio detection means, for controlling the air/fuel ratio to be a desired air/fuel ratio at which the temperature of said small engine is not higher than a predetermined temperature, wherein the air/fuel ratio detection means comprises a stoichiometric air/fuel ratio sensor having an output that changes at a variable rate said output change being rapid in the vicinity of a desired air/fuel ratio, and wherein the control means is operative to temporarily adjust the air/fuel ratio to be richer or leaner than the stoichiometric air/fuel ratio in order to detect an actual air/fuel ratio.

8. A method of controlling an air/fuel ratio of an internal combustion engine comprising the steps of:

a) measuring exhaust gas oxygen content using a stoichiometric air/fuel ratio sensor which is accurately responsive to small changes in exhaust gas oxygen content at a desired air/fuel combustion ratio and providing an output signal representing the measured oxygen content;

b) generating an engine rotation speed representative signal in the form of a series of pulses synchronized with engine rotation;

c) generating a control signal for supplying air to an engine in synchronization with the signal generated in step b);

d) making the air/fuel ratio lean temporarily; and e) adjusting the control signal obtained in the step c), when the signal obtained in step a) is shorter than a predetermined signal, in order to either or both (i)

decrease a quantity of air and (ii) decrease a quantity of fuel to be supplied to the engine, and when the signal obtained in step (a) is longer than a predetermined signal, in order to either or both (i) decrease a quantity of air and (ii) increase a quantity of fuel to be supplied to the engine, so that the air/fuel ratio is close to a desired ratio.

9. The method as set forth in claim 8 wherein said step of making the air/fuel ratio lean temporarily comprises adjusting an intake combustion air flow temporarily and periodically to adjust the air/fuel ratio.

10. The method as set forth in claim 8 wherein said step of making the air/fuel ratio lean temporarily comprises adjusting the fuel flow temporarily and periodically to adjust the air/fuel ratio.

11. A method of controlling an air/fuel ratio of an internal combustion engine comprising the steps of:

a) measuring exhaust gas oxygen content using a stoichiometric air/fuel ratio sensor which is accurately responsive to small changes in exhaust gas oxygen content at a desired air/fuel combustion ratio and providing an output signal representing the measured oxygen content;

b) generating an engine rotation speed representative signal in the form of a series of pulses synchronized with engine rotation;

c) generating a control signal for supplying air to an engine in synchronization with the signal generated in step b);

d) making the air/fuel ratio rich temporarily; and e) adjusting the control signal obtained in the step c), when the signal obtained in step a) is shorter than a predetermined signal, in order to either or both (i) decrease a quantity of air and (ii) increase a quantity of fuel to be supplied to the engine, and when the signal is longer than a predetermined signal, in order to either or both (i) increase a quantity of air and (ii) decrease a quantity of fuel to be supplied to the engine, so that the air/fuel ratio is close to a desired ratio.

12. The method as set forth in claim 11 wherein said step of making the air/fuel ratio rich temporarily comprises adjusting an intake combustion air flow temporarily and periodically to adjust the air/fuel ratio.

13. The method as set forth in claim 11 wherein said step of making the air/fuel ratio rich temporarily comprises adjusting the fuel flow temporarily and periodically to adjust the air/fuel ratio.

* * * * *